(12) United States Patent
Yanagi

(10) Patent No.: US 7,089,094 B2
(45) Date of Patent: Aug. 8, 2006

(54) VEHICLE INFORMATION DISPLAY APPARATUS

(75) Inventor: Katsuyuki Yanagi, Nishinomiya (JP)

(73) Assignee: Furuno Electric Company, Limited, Nishinomiya (JP)

( * ) Notice: Subject to any disclaimer, the term of this patent is extended or adjusted under 35 U.S.C. 154(b) by 54 days.

(21) Appl. No.: 10/855,409

(22) Filed: May 28, 2004

(65) Prior Publication Data

US 2006/0129288 A1 Jun. 15, 2006

Related U.S. Application Data

(62) Division of application No. 10/209,925, filed on Aug. 2, 2002.

(30) Foreign Application Priority Data

| Aug. 3, 2001 | (JP) | ............................. 2001-236780 |
| Aug. 8, 2001 | (JP) | ............................. 2001-241100 |

(51) Int. Cl.
*B60L 3/00* (2006.01)
(52) U.S. Cl. .................................................... 701/21
(58) Field of Classification Search ................. 701/21, 701/200, 207, 208, 209, 213, 300, 301; 342/357.01, 342/357.02, 357.06, 357.08, 357.09, 357.12, 342/357.13, 357.14, 41

See application file for complete search history.

(56) References Cited

U.S. PATENT DOCUMENTS

| 4,281,326 | A |   | 7/1981  | Anderson                    |
| 4,706,090 | A | * | 11/1987 | Hashiguchi et al. ..........342/41 |
| 4,914,733 | A |   | 4/1990  | Gralnick                    |
| 5,381,338 | A | * | 1/1995  | Wysocki et al. ............ 701/207 |
| 5,515,287 | A | * | 5/1996  | Hakoyama et al. ......... 701/301 |
| 5,644,318 | A | * | 7/1997  | Janky et al. ........... 342/357.08 |
| 6,144,915 | A | * | 11/2000 | Shiomi et al. .............. 701/120 |
| 6,249,241 | B1| * | 6/2001  | Jordan et al. ................. 342/41 |
| 6,487,500 | B1| * | 11/2002 | Lemelson et al. .......... 701/301 |

FOREIGN PATENT DOCUMENTS

| GB | 2341505 A   | 3/2000 |
| JP | 61-73081 A  | 4/1986 |
| WO | WO 02/04973 A2 | 1/2002 |

* cited by examiner

Primary Examiner—Richard M. Camby
(74) Attorney, Agent, or Firm—Birch, Stewart, Kolasch & Birch, LLP

(57) ABSTRACT

A vehicle information display apparatus receives multiple pieces of information on mobile vehicles, determines degrees of importance of the individual pieces of information according to specific conditions, and displays symbols of only those mobile vehicles of which importance falls within a predefined range or symbols of only a specific number of mobile vehicles selected according to their importance in graphic form with enhanced visibility.

7 Claims, 12 Drawing Sheets

▽ : AIS TARGET
○ : ARPA TARGET

VEHICLE INFORMATION DISPLAY APPARATUS

CROSS-REFERENCE TO RELATED APPLICATIONS

This application is a divisional of U.S. patent application Ser. No. 10/209,925, filed on Aug. 2, 2002.

BACKGROUND OF THE INVENTION AND RELATED ART STATEMENT

1. Field of the Invention

The present invention relates generally to a display apparatus for simultaneously displaying multiple pieces of information on mobile units (vehicles), such as their positions. More particularly, the invention pertains to a vehicle information display apparatus for displaying necessary pieces of information on vehicles with high visibility. The following discussion deals with a case where such a vehicle information display apparatus is installed on a vessel.

2. Description of the Prior Art

Installation of a system named a universal shipborne automatic identification system (AIS) has been compulsorily required on large vessels from July 2002 to assist in avoiding collisions between the vessels and thereby promote the safety of life at sea.

An important function of the AIS is to broadcast at specific intervals various items of information, such as the position of own ship (prime vehicle), navigational information including voyage information, as well as vessel-related information including vessel name and cargo type. Another important function of the AIS is to receive such information broadcast from other vessels and extract needed pieces of information.

Carriage of an automatic radar plotting aid (ARPA), on the other hand, which is already used on many vessels to aid in avoiding collisions with other target vessels (target vehicles) by use of a radar image, is mandatory on large vessels. Upon receiving target echo data from a radar, the ARPA processes the target data, automatically acquires and tracks target vehicles, calculates the degree of risk of collisions with the target vehicles, and presents target information in readily recognizable form, allowing an operator to continuously watch the movements of target vehicles. When the ARPA detects a dangerous situation, it generates a warning and enables the operator to execute a simulated "trial maneuver" to find out an own ship maneuver for avoiding the collision situation.

More specifically, the ARPA determines successive target positions from the target echo data fed from the radar, calculates relative motion (relative course and speed) of a target vehicle relative to the prime vehicle from varying relative positions of the target vehicle, and work out true motion (two-dimensional true course and speed) of the target vehicle taking into account of the velocity (vector quantity) of the prime vehicle.

An on-screen presentation of the ARPA is produced by superimposing various markings (symbols) representing target information, such as the present and predicted (calculated) positions and motions of the target vehicles, on a radar image.

It is preferable for the operator of the ARPA and the aforementioned AIS systems that any targets acquired and tracked by the ARPA (hereinafter referred to as the ARPA targets) and vessels identified by the AIS (hereinafter referred to as AIS targets) be presented on a common display in graphical form.

As stated above, installation of the AIS system has been mandated since July 2002 on a specific class of large vessels. Since this mandatory carriage requirement of the AIS system is initially limited to the large vessels, target vehicles detected by the AIS (hereinafter referred to as the AIS targets) are all large vessels at the beginning. The mandatory carriage requirement is expected to be applied to smaller vessels in the future, however. Therefore, if symbols of all the AIS targets identified by the AIS system are to be displayed on a single display, the number of target symbols displayed could be considerably large in a future time, particularly in congested areas, such as in navigable waterways and harbor areas, making it difficult to identify the individual AIS targets. Similarly, the number of symbols representing target vehicles detected by the ARPA system (hereinafter referred to as the ARPA targets) could be too large in congested areas, making it difficult to identify the individual ARPA targets.

Shown in FIG. 3C is an example of an AIS display presenting AIS targets all together, in which small squares are symbols indicating the positions of the individual AIS targets, small inverted triangles are symbols indicating the positions of individual ARPA targets, and broken lines indicate a simplified radar image of a coastline. This example shows a situation in which a large number of vessels are navigating close to the coastline of a strait. If cross-channel ferries, workboats and fishing vessels are present in such a water area, the AIS display would actually provide this kind of intricate picture.

Both the ARPA and the AIS are originally intended to enhance the safety of navigation. One problem of the conventional systems is that if all targets including those which may be ignored from the viewpoint of navigation safety are displayed, it would become difficult for an operator of a target information display system to identify important targets on which the operator should primarily focus particular attention for safe navigation.

As previously mentioned, the ARPA targets and the AIS targets are presented on a common display screen in graphical form. As a consequence, a symbol indicating the position, speed and course of an ARPA target derived from a particular target vehicle and a symbol indicating the position, speed and course of an AIS target derived from the same target vehicle are indicated at approximately the same location on the display screen, overlapping one on top of another. This overlapping of the symbols makes it difficult to recognize the position, speed and course of each target.

In addition, if part of acquisition and tracking capacity of the ARPA is used for acquiring and tracking ship targets which have already detected by the AIS system, that part of the limited capacity of the ARPA would be consumed uselessly, resulting in a reduction in the number of targets that can be acquired and tracked by the ARPA.

SUMMARY OF THE INVENTION

In light of the foregoing, it is an object of the invention to provide a vehicle information display apparatus for simultaneously displaying multiple pieces of information on mobile vehicles like vessels on a display screen with a capability to display particularly needed pieces of information with high visibility and with higher emphasis placed on those pieces of information.

Another object of the invention is to provide a vehicle information display apparatus which, in deriving information on target vehicles and displaying their positions and motion, can avoid complexity of on-screen display when there exist a large number of target vehicles to provide improved visibility.

Still another object of the invention is to provide a vehicle information display apparatus and a harbor surveillance apparatus for receiving vehicle identification signals transmitted from target vehicles and displaying their positions extracted from the vehicle identification signals as well as the positions of targets acquired and tracked by using target echo data of a radar, with a capability to provide a highly visible display of target symbols overcoming the aforementioned difficulty in recognizing overlapping ARPA and AIS target symbols for the same target vehicle and to enable efficient vehicle position extraction by an AIS system as well as efficient target acquisition and tracking operations by an ARPA system eliminating the waste of system resources, such as central processing unit (CPU) and memories.

According to a first main feature of the invention, a vehicle information display apparatus comprises a receiver for receiving multiple pieces of information on mobile vehicles, a display device for displaying position information fed from the receiver, and a signal processor for producing image data used for displaying the multiple pieces of information on the mobile vehicles with high visibility.

Preferably, the display device of this vehicle information display apparatus displays the mobile vehicles placing greater emphasis on a selected mobile vehicle.

In one aspect of the invention, the aforementioned mobile vehicles are vessels.

According to a second main feature of the invention, a vehicle information display apparatus for installation on a prime vessel comprises a receiver for receiving vehicle information including at least position information indicating the positions of other vessels, a vehicle information extractor for determining degrees of importance of the vehicle information fed from the receiver according to specific conditions and for extracting those pieces of the vehicle information of which degrees of importance fall within a predefined range, and a display controller for displaying the positions of the vessels corresponding to the extracted pieces of the vehicle information in graphic form.

In one preferred form of the invention, the vehicle information display apparatus is constructed such that the display controller graphically displays the positions of the vessels derived from the vehicle information of which degrees of importance fall within the predefined range as extracted by the vehicle information extractor and the positions of the vessels derived from the vehicle information having the other degrees of importance with different levels of visibility.

In another preferred form of the invention, the vehicle information display apparatus is constructed such that the vehicle information extractor extracts a predefined upper limit number of pieces of the vehicle information selected in the order of the degrees of importance from the piece of the vehicle information having the highest degree of importance.

In another preferred form of the invention, the vehicle information display apparatus is constructed such that the receiver is a universal shipborne automatic identification system for receiving data transmitted from universal shipborne automatic identification systems of other vessels.

In another preferred form of the invention, the vehicle information display apparatus is constructed such that the receiver is an automatic radar plotting aid which provides information on target vessels based on a signal fed from a radar for detecting targets around the prime vessel.

In still another preferred form of the invention, the vehicle information display apparatus is constructed such that the receiver is a combination of a universal shipborne automatic identification system for receiving data transmitted from universal shipborne automatic identification systems of other vessels and an automatic radar plotting aid which provides information on target vessels based on a signal fed from a radar for detecting targets around the prime vessel.

In yet another preferred form of the invention, the vehicle information display apparatus further comprises a collision risk evaluator for assessing the degree of collision risk based on the position and velocity of each target vessel relative to the prime vessel, wherein the degree of collision risk is employed as the degree of importance.

According to a third main feature of the invention, a vehicle information display apparatus comprises a vehicle position information extractor for receiving vehicle identification signals transmitted from vessels and extracting at least position information indicating the positions of the vessels from the vehicle identification signals, a target acquisition/tracking device for acquiring and tracking targets based on target echo data fed from a radar, and a controller for displaying first symbols indicating the positions or velocity vectors of the individual vessels obtained by the vehicle position information extractor as well as second symbols indicating the positions or velocity vectors of the individual targets obtained by the target acquisition/tracking device on a single display device, wherein the controller displays the first symbols with higher priority over the second symbols at and in the proximity of a position where any of the first symbols is displayed.

In one preferred form of the invention, the vehicle information display apparatus is constructed such that the controller prohibits acquisition and tracking of targets by the target acquisition/tracking device at and in the proximity of the position where any of the first symbols is displayed.

In another preferred form of the invention, the vehicle information display apparatus is constructed such that the controller prohibits on-screen display of the second symbols at and in the proximity of the position where any of the first symbols is displayed.

In another preferred form of the invention, the vehicle information display apparatus is constructed such that the controller prohibits on-screen display of the second symbols and target echoes detected by the radar at and in the proximity of the position where any of the first symbols is displayed.

In still another preferred form of the invention, the vehicle information display apparatus is constructed such that the controller prohibits on-screen display of the second symbols without prohibiting on-screen display of target echoes detected by the radar at and in the proximity of the position where any of the first symbols is displayed.

In yet another preferred form of the invention, the aforementioned vehicle position information extractor is an AIS and the aforementioned target acquisition/tracking device is an ARPA.

According to a fourth main feature of the invention, a vehicle surveillance apparatus comprises a vehicle position information extractor for receiving vehicle identification signals transmitted from vessels and extracting at least position information indicating the positions of the vessels from the vehicle identification signals, a target acquisition/tracking device for acquiring and tracking targets based on target echo data fed from a land-based radar, and a controller for displaying first symbols indicating the positions or velocity vectors of the individual vessels obtained by the vehicle position information extractor as well as second symbols indicating the positions or velocity vectors of the individual targets obtained by the target acquisition/tracking device on a single display device, wherein the controller displays the first symbols with higher priority over the second symbols at and in the proximity of a position where any of the first symbols is displayed.

According to a fifth main feature of the invention, a vessel surveillance apparatus comprises a receiver for receiving multiple pieces of information on vessels, a display device for displaying position information on the vessels fed from the receiver, and a signal processor for producing image data used for displaying the multiple pieces of information on the vessels with high visibility.

According to a sixth main feature of the invention, a vehicle information display apparatus displays information obtained by a radar installed on a prime vessel, the information indicating the existence, position and motion trend of targets around the prime vessel, and vehicle information including at least position information derived from vehicle identification signals transmitted from other vessels and received by a vehicle position information extractor, wherein the two kinds of information are superimposed on one another.

According to a seventh main feature of the invention, a vehicle information display apparatus for installation on a prime vessel comprises a receiver for receiving vehicle information transmitted from other vessels, the vehicle information including at least position information indicating the positions of the other vessels, an area setter for setting an area based on the distance from and the direction relative to the prime vessel, a vehicle information extractor for extracting the vehicle information on a vessel existing within the set area from the vehicle information received by the receiver, and a display device for displaying the vehicle information with greater emphasis placed on the vehicle information extracted by the vehicle information extractor than on the unextracted vehicle information.

In one preferred form of the invention, the area set by the area setter is a circle.

According to an eighth main feature of the invention, a vehicle information display apparatus to be installed at a specific fixed point on land for receiving vehicle information transmitted from multiple vessels and displaying the vehicle information on a display screen comprises a receiver for receiving the vehicle information including at least position information indicating the positions of the multiple vessels, an area setter for setting an area based on the distance from and the direction relative to the fixed point, a vehicle information extractor for extracting the vehicle information on a vessel existing within the set area from the vehicle information received by the receiver, and a display device for displaying the vehicle information with greater emphasis placed on the vehicle information extracted by the vehicle information extractor than on the unextracted vehicle information.

According to a ninth main feature of the invention, a vehicle information display apparatus for installation on a prime vessel comprises a receiver for receiving vehicle information transmitted from other vessels, the vehicle information including at least position information indicating the positions of the other vessels, an area setter for setting an area, a vehicle information extractor for extracting the vehicle information on a vessel existing within the set area from the vehicle information received by the receiver, and a display device for displaying the vehicle information with greater emphasis placed on the vehicle information extracted by the vehicle information extractor than on the unextracted vehicle information.

These and other objects, features and advantages of the invention will become more apparent upon reading the following detailed description in conjunction with the accompanying drawings.

DETAILED DESCRIPTION OF THE PREFERRED EMBODIMENTS OF THE INVENTION

Configurations of vehicle information display apparatus according to first to fourth embodiments of the invention are now described with reference to FIGS. 1 to 6.

Figure 1:
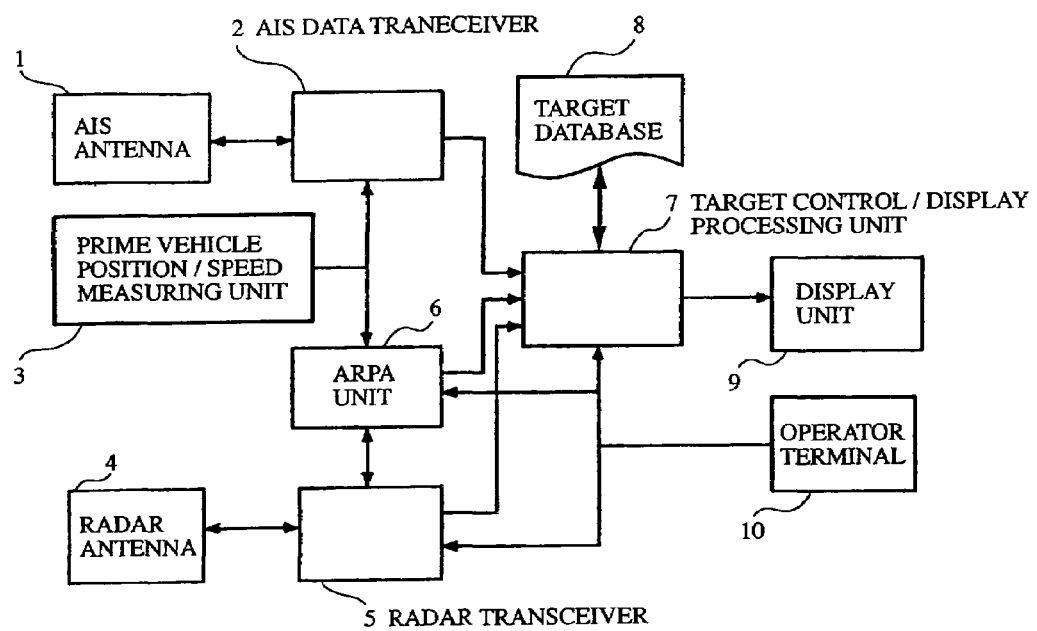
FIG. 1 is a block diagram showing the overall configuration of a vehicle information display apparatus according to a first embodiment of the invention.

FIG. 1 is a block diagram showing the overall configuration of a vehicle information display apparatus according to the first embodiment of the invention, in which designated by the numeral 4 is a radar antenna and designated by the numeral 5 is a radar transceiver which controls transmit and receive operations of a radar set through the radar antenna 4. The radar transceiver 5 includes an analog-to-digital (A/D) converter for sampling received signals and converting them into digital data and a primary memory for initially storing the digital data. The radar transceiver 5 further includes means for writing data to be used for displaying a detected radar picture into a display memory provided in a data control/display processing unit 7 based on radar echo data for one sweep (derived from one antenna rotation) written in the primary memory, antenna direction data derived from a timing signal fed from the radar antenna 4 and heading data of a prime vehicle fed from a compass (not shown).

An ARPA unit 6 includes means for acquiring a target (target vehicle) from radar echo information obtained by the radar transceiver 5, means for predicting motion of the acquired target vehicle, means for tracking a target designated through an operator terminal 10, and means for writing display data for displaying the position of the target acquired and currently tracked into the display memory in the data control/display processing unit 7.

Designated by the numeral 1 is an antenna for an AIS system. An AIS data transceiver 2 receives various data broadcast from other target vehicles by means of the AIS antenna 1 and the data control/display processing unit 7 reads vehicle identification information of the target vehicles. The AIS data transceiver 2 also broadcasts vehicle identification information of the prime vehicle through the AIS antenna 1.

A prime vehicle position/speed measuring unit 3 measures the position and speed of the prime vehicle by use of a speed log and a global positioning system (GPS) receiver, for example.

The data control/display processing unit 7 presents symbols indicating the positions and motions of target vehicles obtained by the AIS data transceiver 2 on a display unit 9. The data control/display processing unit 7 also presents symbols indicating the positions and motions of target vehicles obtained by the AIS data transceiver 2 on the display unit 9. In addition, the data control/display processing unit 7 presents target echoes surrounding the prime vehicle produced by the radar transceiver 5. This data control/display processing unit 7 corresponds to a vehicle information extractor and a display controller mentioned in the claims of this invention.

The operator terminal 10 includes a keyboard and a pointing device, such as a trackball. Using the operator terminal 10, an operator enters an instruction to select a desired display mode to the data control/display processing unit 7, an instruction specifying targets to be tracked by the ARPA unit 6, and various settings to the radar transceiver 5 for target detection by the radar.

A target database 8 is a database used for management of later-described data on AIS and ARPA targets. The data control/display processing unit 7 continuously updates on-screen data content based on the data stored in the target database 8.

Data items stored in the target database 8 are as follows:
AIS Target Data Items
(A1) Vehicle position
(A2) Vehicle speed
(A3) Vehicle course
(A4) Distance to a target from the prime vehicle
(A5) Angular distance between the direction (bearing) of a target and the heading of the prime vehicle
(A6) Distance to the closest point of approach (CPA) to a target, or DCPA
(A7) Time to CPA (TCPA)
(A8) Degree of collision risk
(A9) Importance
(A10) Vehicle length
ARPA Target Data Items
(B1) Vehicle position
(B2) Vehicle speed
(B3) Vehicle course
(B4) Distance to a target from the prime vehicle
(B5) Angular distance between the direction (bearing) of a target and the heading of the prime vehicle
(B6) Distance to the closest point of approach (CPA) to a target, or DCPA
(B7) Time to CPA (TCPA)
(B8) Degree of collision risk
(B9) Importance
(B10) Vehicle length The aforementioned items (A1) to (A3) are information included in AIS communications data while the items (A4) to (A7) are calculated from the position, speed and course of the prime vehicle and those of a given target vehicle. The importance of the items (A9) to (B9) will be described later in detail. The degree of collision risk of the item (A8) is obtained from DCPA and TCPA. If the AIS communications data includes information on the draft of the vehicle, it may be taken into consideration in judging the degree of collision risk of the item (A8).

Figure 2:
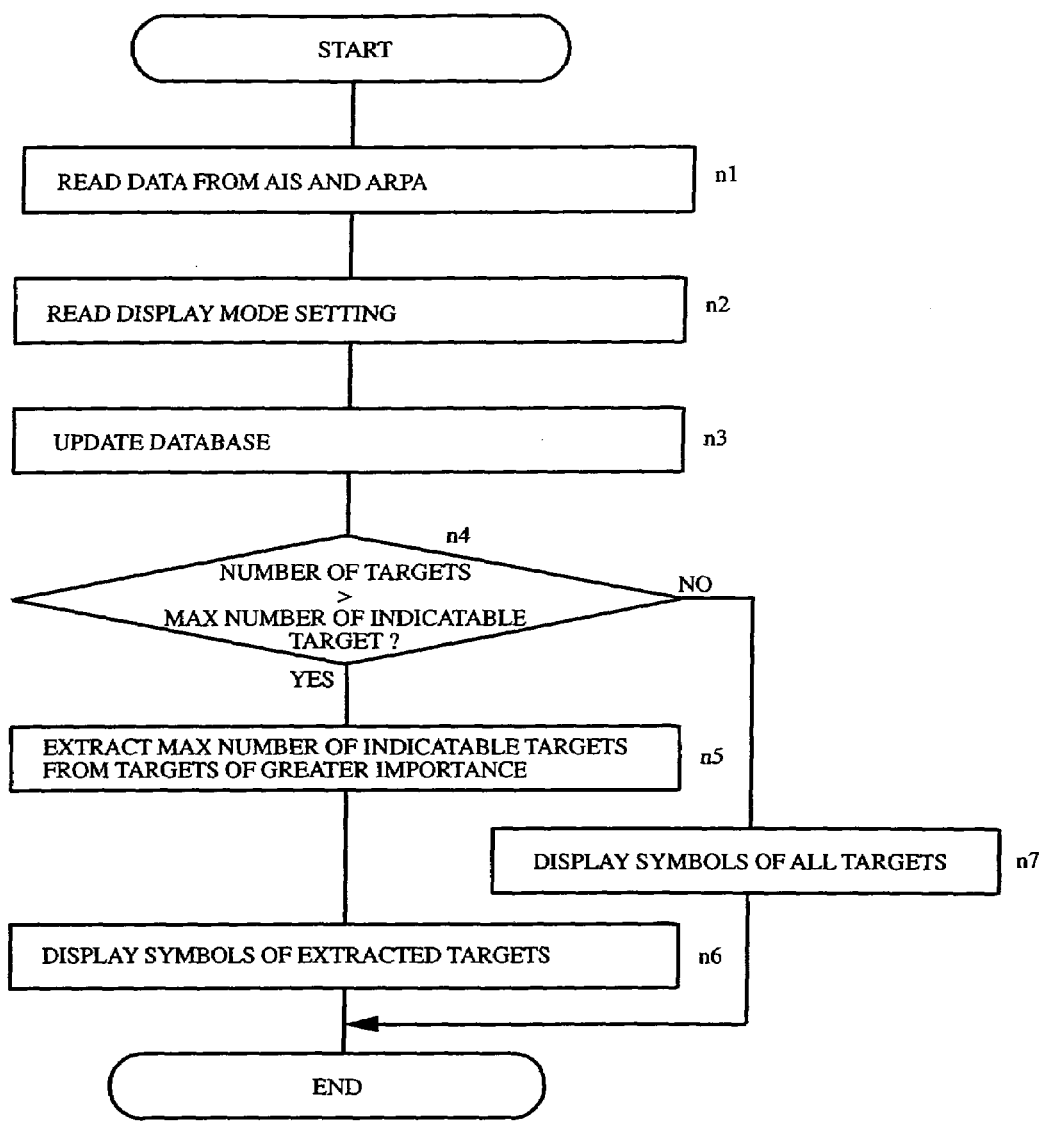
FIG. 2 is a flowchart showing an operational sequence of a data control/display processing unit of the apparatus of FIG. 1.

FIG. 2 is a flowchart showing an operational sequence performed by the data control/display processing unit 7 for presenting the symbols of individual target vehicles according to the first embodiment. The operational sequence is described below referring to the flowchart.

First, the data control/display processing unit 7 takes in target vehicle information from the AIS data transceiver 2 and the ARPA unit 6 (step n1). The data control/display processing unit 7 then takes in a display mode setting (step n2). The display mode selected by the operator defines target vehicles which should be regarded as targets of greater importance.

Varying degrees of importance are attached to different kinds of targets as described below:
(a) Target vehicles closer to the prime vehicle should be regarded as of being progressively greater importance.
(b) Target vehicles at smaller angular distances from the heading of the prime vehicle should be regarded as of being progressively greater importance.
(c) Target vehicles moving at higher speeds should be regarded as of being progressively greater importance.
(d) Target vehicles having larger lengths should be regarded as of being progressively greater importance.
(e) Target vehicles presenting higher degrees of collision risk should be regarded as of being progressively greater importance.
(f) Using the above assessment criteria (a) to (e), or part of them, points (numerical values) representing the degrees of importance of individual target vehicles are calculated, and target vehicles greater points are regarded as of being progressively greater importance.

According to the aforementioned operator settings, the data control/display processing unit 7 updates information on the importance of the individual target vehicles stored in the target database 8 (step n3).

Subsequently, the data control/display processing unit 7 judges whether the number of targets exceeds or not a maximum number of indicatable targets that can be distinguished from one another, the maximum number of indicatable targets being predefined according to the on-screen size of each target symbol and the size of display screen, and displays the symbols of all target vehicles indicating their positions if the number of the target vehicles is equal to or smaller than the predefined maximum number of indicatable targets (steps n4 to n7). This maximum number of indicatable targets corresponds to an "upper limit number" mentioned in the claims of this invention. If the number of the target vehicles is larger than the maximum number of indicatable targets, the maximum number of indicatable targets are extracted as target vehicles for on-screen display from the aforementioned target vehicles of greater importance as defined according to the display mode and their symbols are displayed on the display unit 9 (steps n5 to n6).

Figure 3A:
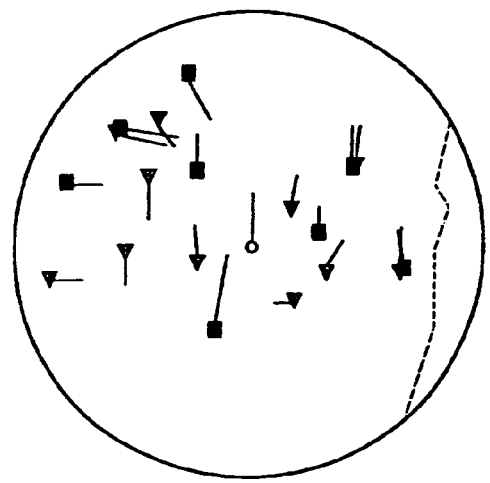
FIGS. 3A–3C are examples of pictures displayed on a display screen of the apparatus of FIG. 1.
Figure 3B:
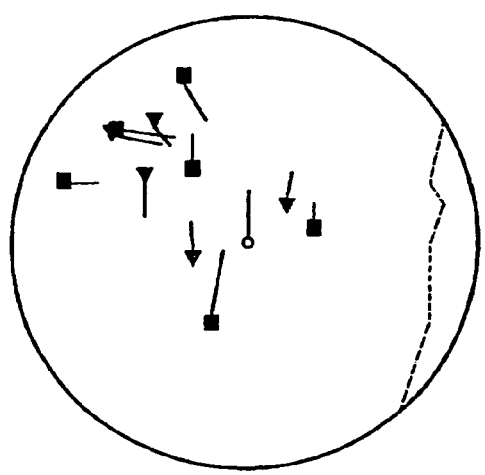
Figure 3C:
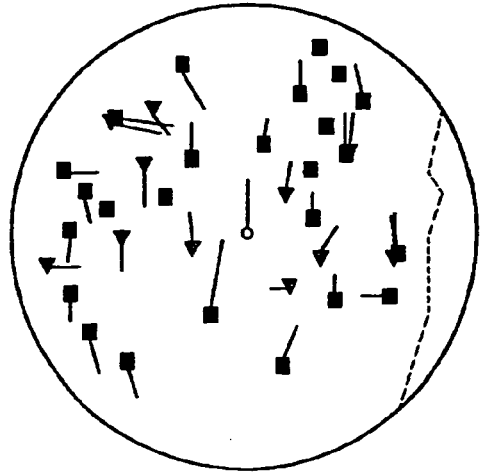

FIGS. 3A–3C are examples of pictures displayed on the display unit 9, in which a small circle indicates the position of the prime vehicle, small squares are symbols indicating the positions of individual AIS targets, and small inverted triangles are symbols indicating the positions of individual ARPA targets. Straight lines extending from the small squares and inverted triangles are vectors of which directions and lengths show the moving directions and speeds of the individual target vehicles. In addition, broken lines indicate a simplified radar image of a coastline. As previously mentioned, shown in FIG. 3C is an example in which symbols of the detected target vehicles are displayed all together. Shown in FIG. 3B is an example showing the symbols of only the AIS and ARPA targets of great importance as defined according to the display mode. In this example, target vehicles presenting higher degrees of collision risk are regarded as of being greater importance, and a specified number of target vehicles of great importance including the target vehicle presenting the highest degree of collision risk are displayed on-screen. Shown in FIG. 3A is an example showing the symbols of the AIS targets of great importance as defined according to the display mode together with the symbols of all the ARPA targets. Since the ARPA target symbols displayed on-screen normally represent target vehicles intentionally selected through the ARPA unit 6 by the operator, they are usually important targets. Therefore, it is one preferable form of use of the apparatus to show the symbols of the AIS targets of great importance as defined according to the display mode and the symbols of all the ARPA targets as exemplified in FIG. 3A.

If target vehicles presenting higher degrees of collision risk are displayed with higher priority as described above, target vehicles presenting lower degrees of collision risk will not be displayed as a consequence. This approach helps to avoid complexity of the on-screen display and makes it possible to easily recognize target vehicles of greater importance.

A vehicle information display apparatus according to the second embodiment of the invention is now described. The overall configuration of the apparatus is the same as shown in FIG. 1.

Figure 4:
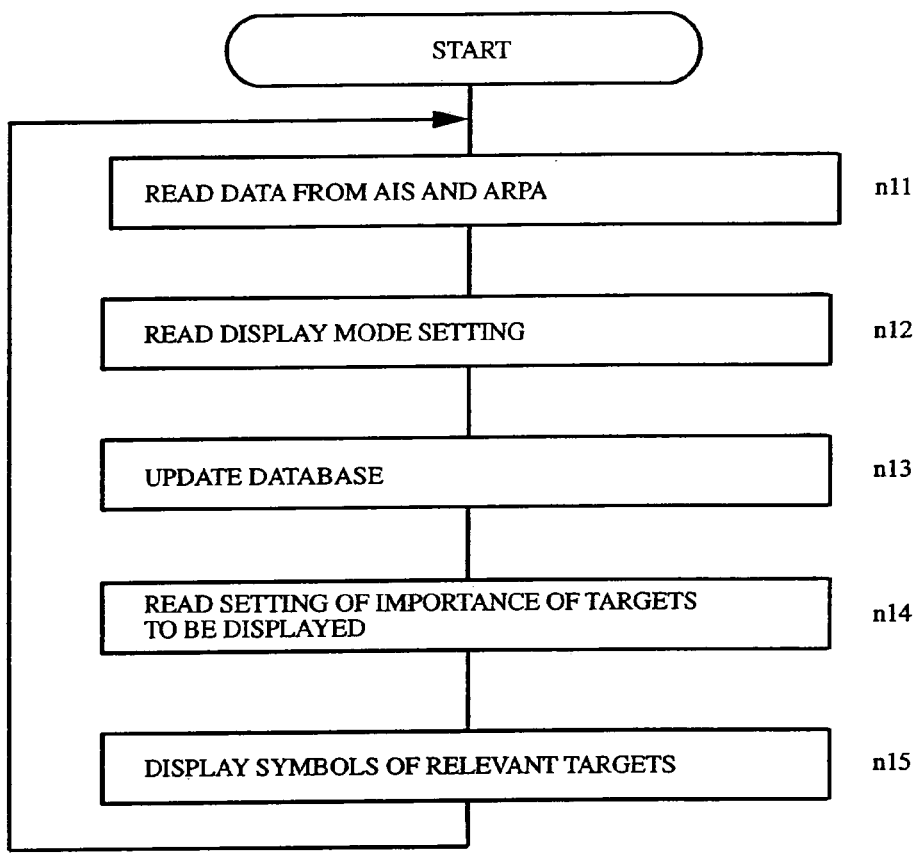
FIG. 4 is a flowchart showing an operational sequence performed by a data control/display processing unit of a vehicle information display apparatus according to a second embodiment of the invention.

FIG. 4 is a flowchart showing an operational sequence according to the second embodiment performed by the data control/display processing unit 7 of the vehicle information display apparatus of FIG. 1. First, the data control/display processing unit 7 takes in information on individual target vehicles from the AIS data transceiver 2 and the ARPA unit 6 (step n11) as well as a display mode setting entered by the operator through the operator terminal 10 (step n12). The data control/display processing unit 7 then calculates the importance of the individual target vehicles and updates information on the importance of the individual target vehicles according to the display mode and updates the information on the importance of the target vehicles stored in the target database 8 (step n13). In this step, the target vehicles are classified into several grades (e.g., three grades designated A, B and C) according to their importance. Subsequently, the data control/display processing unit 7 takes in an operator setting of the grade of importance of target vehicles to be displayed on-screen (step n14) and displays those target vehicles which are classified in the operator-selected grade of importance (step n15). If the operator has specified the highest grade of importance, for example, only those target vehicles falling in the highest grade of importance are displayed so that the operator can selectively recognize the target vehicles of the highest importance with ease. In addition, by temporarily specifying a grade of lower importance, the operator can examine those target vehicles which have been masked (or not displayed) behind the target vehicles of the highest importance.

A vehicle information display apparatus according to the third embodiment of the invention is now described. While the vehicle information display apparatus of the aforementioned first and second embodiments display only those target vehicles which are selected according to their importance, the apparatus of the third embodiment also displays unselected target vehicles while displaying the positions of the selected target vehicles with enhanced visibility.

Figure 5:
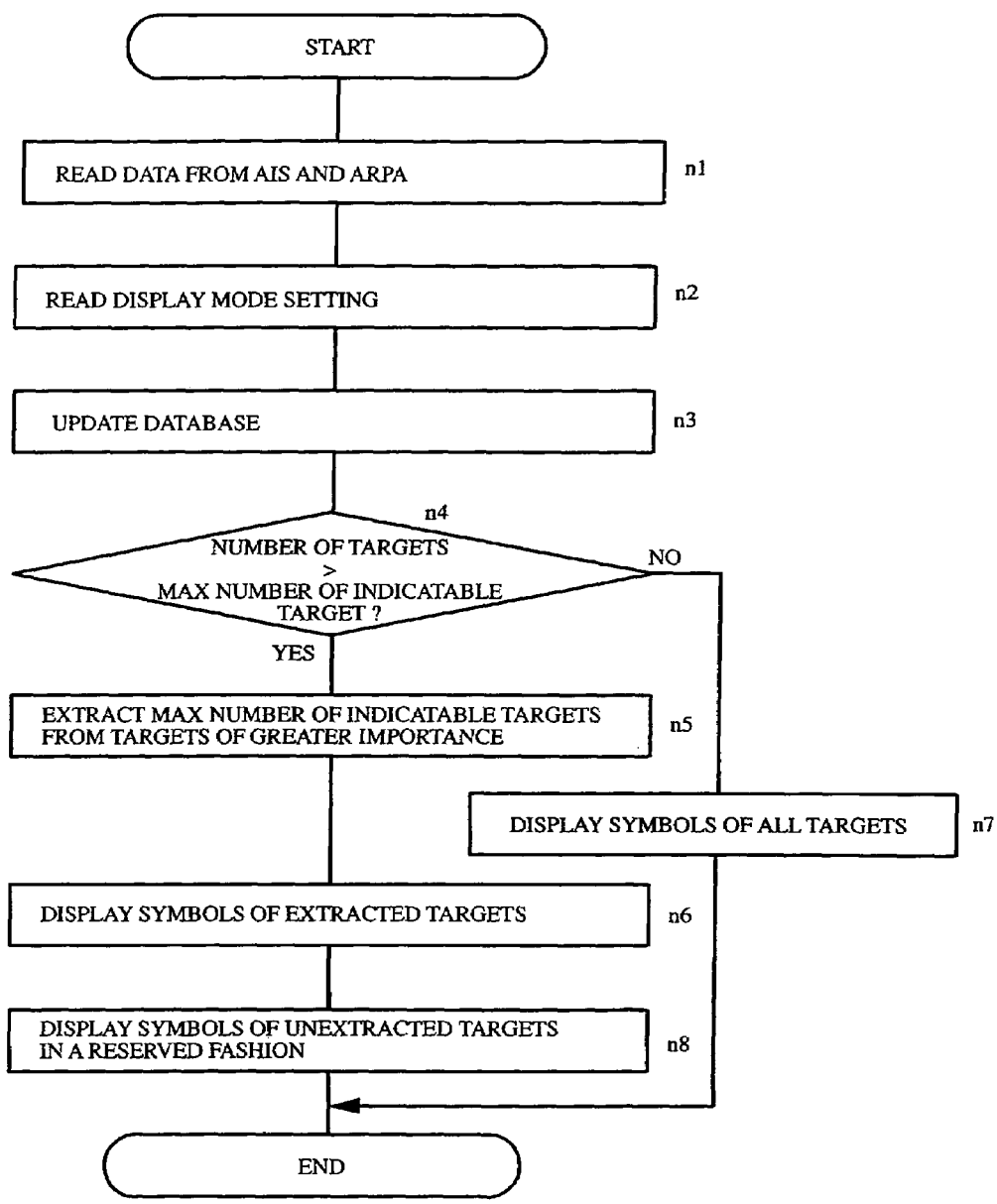
FIG. 5 is a flowchart showing an operational sequence performed by a data control/display processing unit of a vehicle information display apparatus according to a third embodiment of the invention.

The overall configuration of the apparatus of the third embodiment is the same as shown in FIG. 1. FIG. 5 is a flowchart showing an operational sequence according to the third embodiment performed by the data control/display processing unit 7. Steps n1 to n7 of FIG. 5 are identical to steps n1 to n7 of the first embodiment of FIG. 2. In step n8 of FIG. 5, the apparatus displays the symbols of the unselected target vehicles in a moderate, or reserved, fashion compared to the other target vehicles.

Given below are examples of methods for displaying the unselected target vehicles in a reserved fashion:

(1) To display the symbols of the unselected target vehicles in a color more similar to a background color and in a density closer to the background compared to the symbols of the selected target vehicles.

(2) To display only the outlines of the symbols of the unselected target vehicles while displaying the selected target vehicles with their symbols infilled.

(3) To display the symbols of the unselected target vehicles in broken lines while displaying the symbols of the selected target vehicles in solid lines.

(4) To display the unselected target vehicles in small-sized symbols while displaying the selected target vehicles in large symbols.

(5) To display the unselected target vehicles in inconspicuous symbols while displaying the selected target vehicles in conspicuous symbols.

(6) To display the symbols of the unselected target vehicles at specific time intervals while displaying the symbols of the selected target vehicles continuously.

According to the aforementioned display methods (1) to (5), the symbols of the unselected target vehicles do not obscure the symbols of the selected target vehicles. Thus, these display methods make it possible to recognize the positions of the unselected target vehicles without deteriorating the visibility of the symbols of the selected target vehicles.

According to the display method (6) above, periods during which only the symbols of the selected target vehicles are displayed and periods during which the symbols of the unselected target vehicles are displayed together with the symbols of the selected target vehicles are alternately switched. This display method is identical to an alternate presentation of the picture of FIG. 3A or 3B and the picture of FIG. 3C. The period of time during which the symbols of the unselected target vehicles are displayed is relatively short in this display method. Therefore, the display method (6) also makes it possible to recognize the positions of the unselected target vehicles without deteriorating the visibility of the symbols of the selected target vehicles.

Next, a vehicle information display apparatus according to the fourth embodiment of the invention is described. The positions of the unselected target vehicles are indicated while maintaining high visibility of the symbols of the selected target vehicles in the foregoing third embodiment. In contrast to this, the symbols of all the target vehicles are normally displayed and the symbols of only the selected target vehicles are displayed or their visibility is relatively increased by key operation, for example, in the fourth embodiment.

Figure 6:
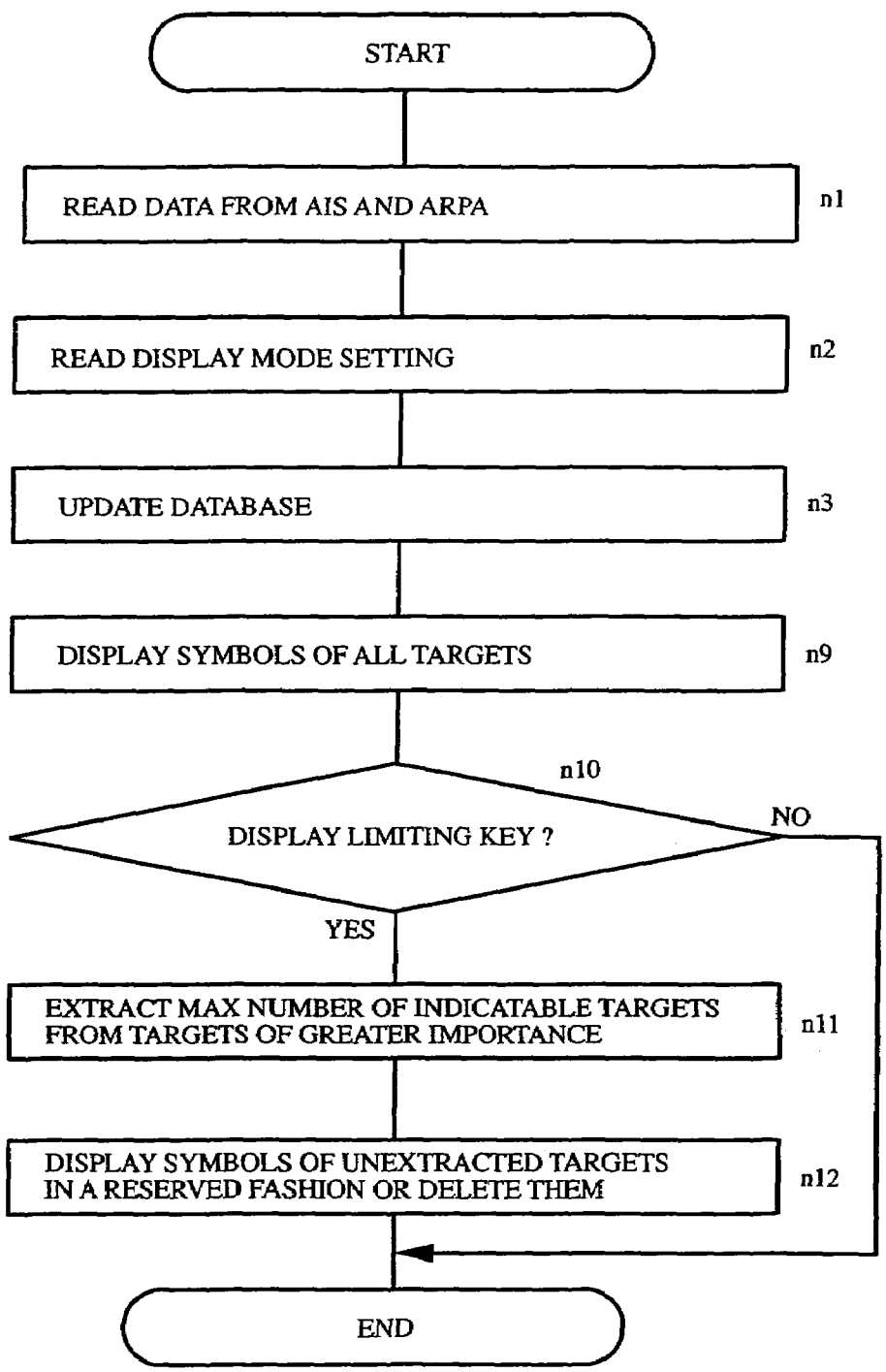
FIG. 6 is a flowchart showing an operational sequence performed by a data control/display processing unit of a vehicle information display apparatus according to a fourth embodiment of the invention.

The overall configuration of the apparatus of the fourth embodiment is the same as shown in FIG. 1. FIG. 6 is a flowchart showing an operational sequence according to the fourth embodiment performed by the data control/display processing unit 7. Steps n1 to n3 of FIG. 6 are identical to steps n1 to n3 of the first embodiment of FIG. 2. In step n9 of FIG. 6, the apparatus displays the symbols of all the target vehicles. If the operator operates a key, for example, for limiting display of the symbols the data control/display processing unit 7, a maximum number of indicatable targets are extracted as target vehicles for on-screen display from target vehicles of greater importance as defined according to the display mode (steps n10 to n11). Then, the data control/display processing unit 7 displays the symbols of the unselected target vehicles in a reserved fashion compared to the symbols of the selected target vehicles, or deletes the symbols of the unselected target vehicles while displaying the symbols of the selected target vehicles alone (step n12).

The apparatus may be constructed such that the operator can enter a command by a key operation, for example, to relatively increase the visibility of the selected target vehicles as described above only when target vehicles of great importance have been identified.

Configurations of vehicle information display apparatus according to fifth to seventh embodiments of the invention are now described with reference to FIGS. 7 to 12.

Figure 7:
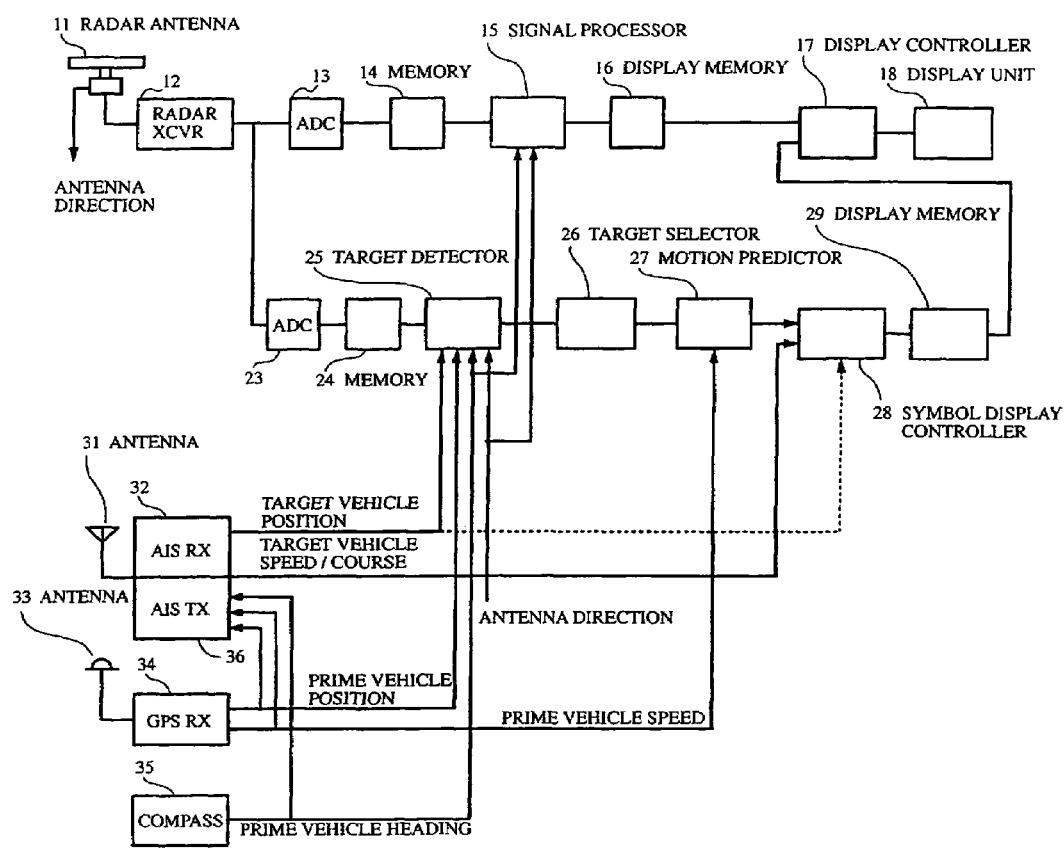
FIG. 7 is a block diagram showing the overall configuration of a vehicle information display apparatus according to a fifth embodiment of the invention.

First, the vehicle information display apparatus of the fifth embodiment is described below referring to referring to FIG. 7, which is a block diagram showing functional blocks of the apparatus itself and other devices that work in conjunction with the apparatus. Designated by the numerals 11 and 12 in FIG. 7 are a radar antenna and a radar transceiver, respectively. The radar transceiver 12 controls a transmitting circuit provided in the antenna 11 as well as receive operation of a radar set. Designated by the numerals 13 and 23 are analog-to-digital (A/D) converters for sampling received signals and converting it into digital data, and designated by the numerals 14 and 24 are memories for temporarily storing received radar echo data for one sweep. A signal processor 15 writes data to be used for displaying a detected radar picture in a display memory 16 based on the radar echo data for one sweep, antenna direction data derived from heading pulses and bearing pulses fed from the antenna 11, and heading data of the prime vehicle fed from a compass 35. A display controller 17 reads out the data stored in the display memory 16 in synchronism with display timing of a display unit 18 and outputs a display signal to the display unit 18. As a consequence, the display unit 18 displays the detected radar picture.

An AIS receiver 32 receives by its antenna 31 vehicle identification signals transmitted from other vehicles, or target vehicles. On the contrary, an AIS transmitter 36 transmits a vehicle identification signal of the prime vehicle. Given below are general specifications of the vehicle identification siqnal:

| | |
|---|---|
| AIS channels: | CH 87B (161.975 MHz), CH 88B (162.025 MHz) |
| Channel spacing: | 12.5 MHz or 25 MHz, switchable |
| Output power: | 2 W or 12.5 W, switchable |
| Type of modulation: | Gaussian minimum shift keying (GMSK) |
| Bit rate: | 9600 bps |
| Communication method: | Self-organizing time division multiple access (SOTDMA) |
| Communications information: | Transmits dynamic information (vehicle's position, speed, course) at 2 to 3-second intervals depending on the speed as well as static information (vehicle's draft, cargo, destination, etc.) at 6-minute intervals. |

Upon receiving radio signals from multiple GPS satellites with an antenna 33, a GPS receiver 34 calculates the position and speed of the prime vehicle.

A target detector 25 of FIG. 7 determines the position of each target relative to the prime vehicle based on the radar echo data successively written in the memory 24 and the heading and antenna direction of the prime vehicle. The target detector 25 also prohibits detection of targets corresponding to target vehicles identified by the AIS receiver 32 among a plurality of targets to be detected based on the positions of multiple target vehicles of which data have been received by the AIS receiver 32 as well as on the position, heading and antenna direction of the prime vehicle.

Referring again to FIG. 7, the target detector 25, a target selector 26, a motion predictor 27, a symbol display controller 28 and a display memory 29 together perform ARPA functions.

The target selector 26 selects only those targets which are currently tracked among multiple targets detected by the target detector 25 and transmits data on the selected targets to the motion predictor 27. As an example, the target selector 26 selects a maximum number of acquirable targets with higher priority given to those targets which present higher degrees of collision risk among the detected targets.

The motion predictor 27 calculates the speed relative to the prime vehicle of each target selected by the target selector 26 and estimates (predicts) true motion (two-dimensional true velocity) of the selected target based on the speed of the prime vehicle obtained by the GPS receiver 34.

The symbol display controller 28 writes data used for displaying symbols indicating the positions and velocity vectors of target vehicles in the display memory 29 based on the positions and motions of the individual target vehicles predicted by the motion predictor 27 as well as on their positions, speeds and courses determined by the AIS receiver 32. The display controller 17 reads out data on the detected radar picture written in the display memory 16 and symbol display data written in the display memory 29 and generates a display signal by synthesizing the read data. Consequently, the display unit 18 presents a picture like the one shown in FIG. 8A.

The AIS receiver 32 corresponds to a "vehicle position information extractor," a combination of the target detector 25, the target selector 26 and the motion predictor 27 corresponds to a "target acquisition/tracking device," and a combination of the symbol display controller 28, the display memory 29, the display controller 17 and the display unit 18 corresponds to a "controller" respectively mentioned in the claims of this invention.

Figure 8A:
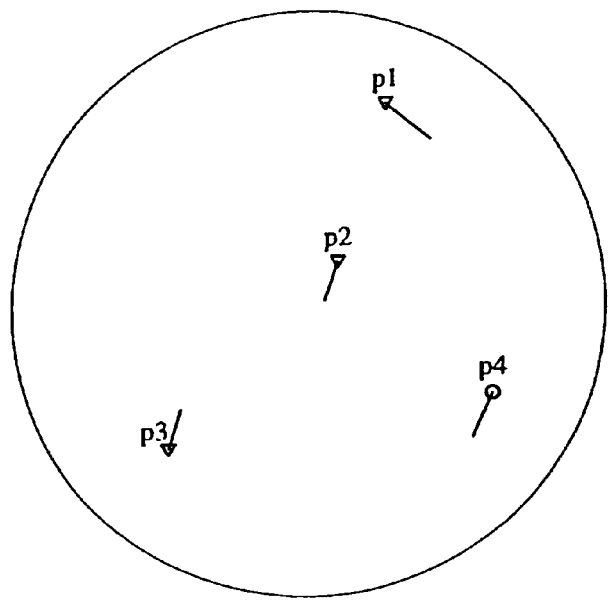
FIGS. 8A and 8B are examples of pictures displayed on a display screen of the apparatus of FIG. 7.
Figure 8B:
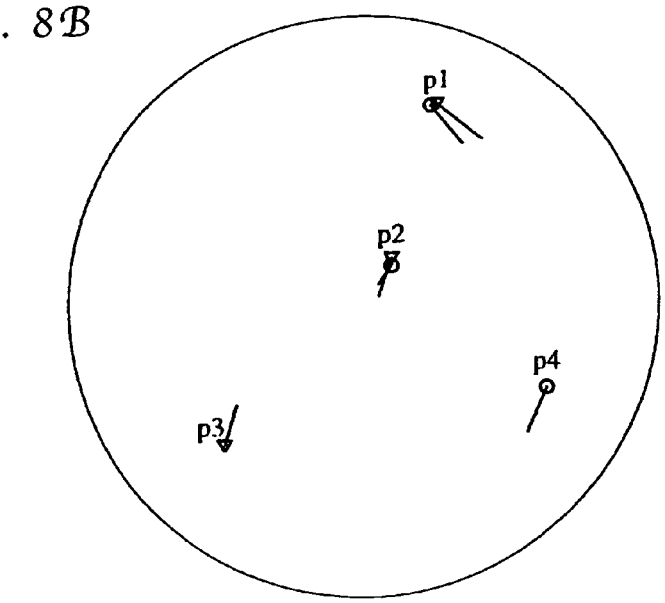

FIGS. 8A and 8B are examples of pictures displayed on the display unit 18. Referring to FIG. 8A, p1 to p4 indicate the positions of target vehicles, small inverted triangles are symbols representative of individual AIS targets, or the symbols ("first symbols" mentioned in the claims of this invention) indicating the positions of the target vehicles identified by the AIS system, and small circles are symbols representative of individual ARPA targets, or the symbols ("second symbols" mentioned in the claims of this invention) indicating the positions of the target vehicles detected by the ARPA system. Straight lines extending from the symbols of the individual AIS targets are true vectors of which directions and lengths show the moving directions and speeds of the individual target vehicles identified by the AIS system. Also, the straight lines extending from the symbols of the individual ARPA targets are relative vectors indicating the moving directions and speeds of the individual target vehicles relative to the prime vehicle.

If the target detector 25 controls on-screen presentation of the symbols of the AIS and ARPA targets independently of each other and displays their synthesized image without taking into account information on the positions, speeds and courses determined by the AIS receiver 32, the display unit 18 will present a picture like the one shown in FIG. 8B. As can be seen from FIG. 8B, the symbols of the AIS and ARPA targets p1, p2 and p3 overlap one on top of another, making it difficult to recognize the position, speed and course of each target in this case. By comparison, if the symbols of the AIS targets are displayed with higher priority where they overlap with the symbols of the ARPA targets, the on-screen picture becomes easier to view as shown in FIG. 8A, and this decreases the risk of misinterpreting the picture. Furthermore, because the positions, speeds and courses of the target vehicles obtained by the AIS generally have higher accuracies than those obtained by the ARPA based on the radar echo data, it is possible to avoid loss of information on the target vehicles by giving higher priority to the symbols of the AIS targets.

Although detected radar echoes are not shown in FIGS. 8A and 8B for the sake of simplicity of the drawings, target echoes in the background of the AIS and ARPA symbols are either masked by the symbols or overlapped by them, just appearing in part out of their periphery, in actuality. In addition, although not shown in FIGS. 8A and 8B, radar echoes of coastlines and islands, should they be present, would be displayed at their respective locations.

Figure 10:
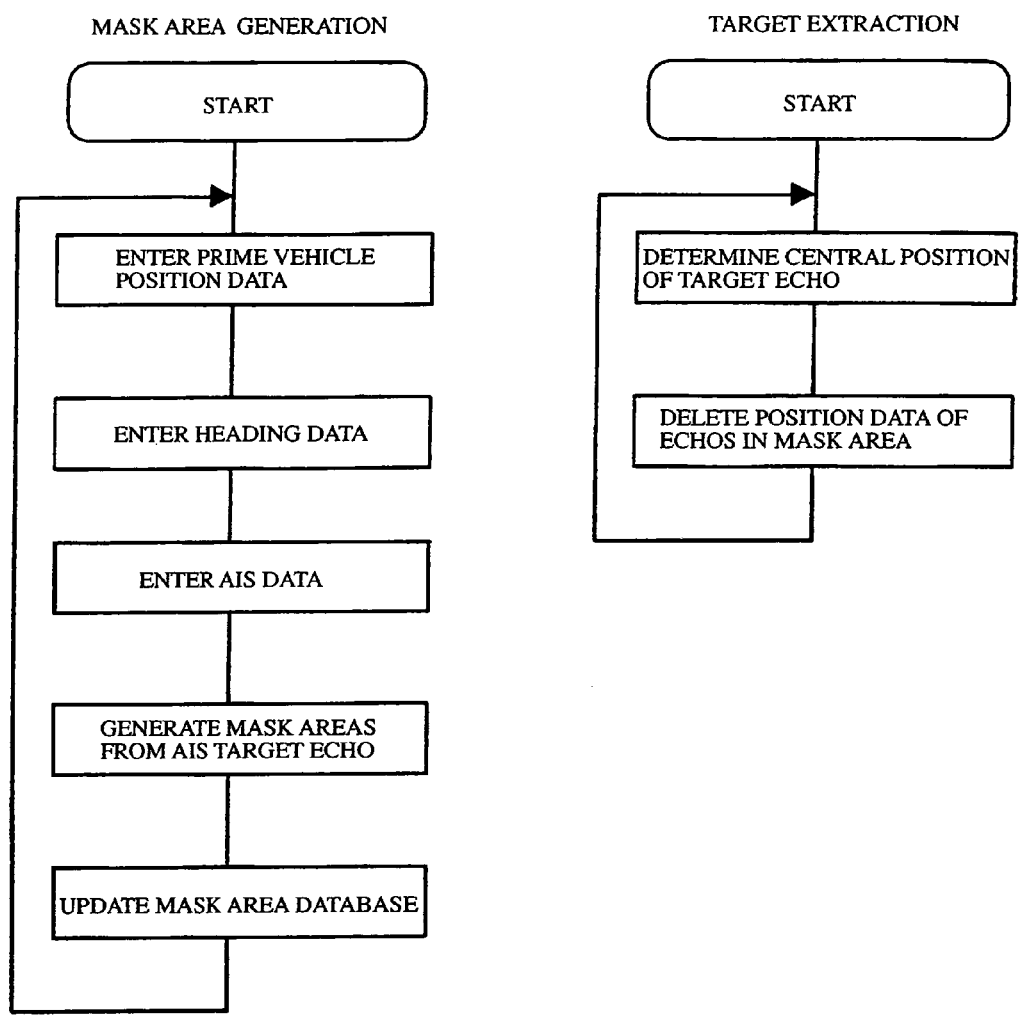
FIG. 10 is a flowchart showing operational sequences performed by the target detector.

An operational sequence performed by the target detector 25 of the apparatus of FIG. 7 is now described referring to a flowchart of FIG. 10.

When differences in the positions and velocities between an AIS target and an ARPA target are smaller than specified thresholds, they can be regarded as the same target. The ARPA has the possibility of such tracking errors as target loss and target swop. Target loss is a situation in which a tracked target is lost due to a sudden change in speed or course of the target, or due to a loss of echo signal from the target. Target swop is a situation in which the ARPA begins to incorrectly track another tracked or non-tracked target which has entered into the proximity of a predicted position of the tracked target. Furthermore, there is a time delay in target course and speed information generated by the ARPA because the ARPA performs a smoothing operation to minimize the effects of measuring errors. This kind of error caused by the time delay is most apparent when a target vehicle is turning. For reasons stated above, it is difficult ensure that AIS target information and ARPA target information match exactly. Under these circumstances, acquisition and tracking of a target by the ARPA is prohibited at and in the proximity of the position of a target vehicle identified by the AIS system.

Figure 9:
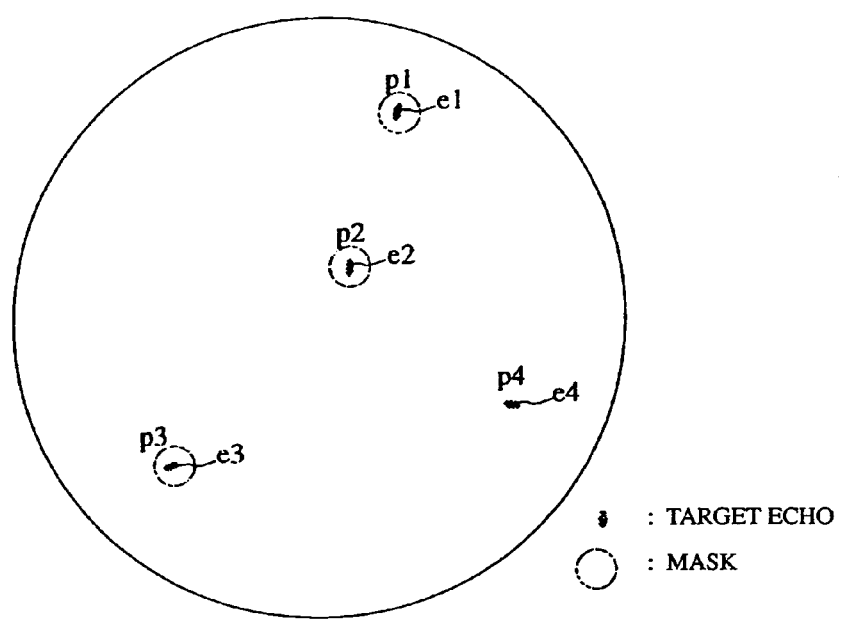
FIG. 9 is a diagram showing an example of mask areas generated by a target detector of the apparatus of FIG. 7.

A mask area generating operation performed by the vehicle information display apparatus of FIG. 7 is now described. First, the prime vehicle's position and heading data are entered from the GPS receiver 34 and the compass 35 to the target detector 25, respectively, while AIS data including the positions, speeds and courses of individual target vehicles derived from their vehicle identification information are entered from the AIS receiver 32 to the target detector 25. Based on these data, the target detector 25 generates mask areas at the target vehicle locations relative to the prime vehicle. For example, the target detector 25 generates circular mask areas having a specific radius centered around the AIS targets p1, p2 and p3 as shown in FIG. 9, in which the mask areas are depicted by broken lines and e1 to e4 indicate radar echoes of the detected target vehicles.

Data on the aforementioned mask areas is continually updated so that the latest mask area data obtained in an immediately preceding update cycle is held in the form of a database. The mask area data may be updated either at reception of each successive AIS signal or at specific time intervals.

In a target extracting operation shown in FIG. 10, the target detector 25 determines, or estimates, the center of each target from its corresponding radar echo. The target detector 25 then judges whether the estimated central position of a target falls within its corresponding mask area. If the estimated central position of the target lies within the mask area, the target detector 25 deletes position data of the target. This means that only those radar echoes of targets which do not lie in the mask areas are treated as targets to be acquired and tracked by the ARPA.

The vehicle position obtained from the AIS target information is the position of a GPS antenna installed on a target vehicle. Since the GPS antenna does not necessarily match the central position of the target vehicle, a certain amount of difference normally occurs between the vehicle position given by the AIS and the central position of the target echo determined by the target detector 25. Because of this difference, it is necessary that each mask area be of a certain size. On the other hand, however, the vehicle identification signal contains as part of its static information the vehicle length and width (beam), type of the vehicle and the location of the GPS antenna (aft or bow and port or starboard of centerline), and these pieces of information are transmitted every 6 minutes. Therefore, the mask area may be set to a minimum necessary size (radius) based on an expected maximum deviation of the central position of an ARPA target from the target position determined by the AIS.

The aforementioned mask area generating operation for generating the mask area database and the target extracting operation based on the detected radar echoes may be performed simultaneously by different central processing units (CPUs).

Furthermore, although the target detector 25 selects the targets to be acquired and tracked with reference to the mask area database in the example shown in FIG. 7, this operation may be performed by the target selector 26.

Referring again to FIG. 7, the configuration of the vehicle information display apparatus according to the sixth embodiment is now described. Although the target detector 25 performs the control operation for prohibiting detection of ARPA targets existing at the locations of corresponding AIS targets in the foregoing fifth embodiment, the symbol display controller 28 prohibits on-screen display of ARPA target symbols indicating the positions and velocities of the ARPA targets at and in the proximity of target vehicles based on target vehicle position information fed from the AIS receiver 32 in the sixth embodiment. The symbol display controller 28 displays only the AIS symbols indicating the positions and velocities of target vehicles identified by the AIS at the locations of the "prohibited" ARPA targets.

More specifically, the symbol display controller 28 does not write (or inhibits the writing of) data for displaying the symbols of the prohibited ARPA targets at the locations of the corresponding target vehicles based on the target vehicle position information fed from the AIS receiver 32. The symbol display controller 28 then writes data for displaying the AIS symbols at locations of those target vehicles in the display memory 29.

As a result of this operation, the ARPA symbols are not displayed in areas where the symbols indicating the positions and velocities of the AIS targets. This makes it possible to easily recognize the symbols of the AIS targets.

In the sixth embodiment described above, the AIS symbols overlie the radar echoes of the corresponding target vehicles, because the radar echo data written in the display memory 16 is read out for on-screen display. The apparatus of the sixth embodiment may be modified such that display of the radar echoes is also prohibited at and in the proximity of the AIS targets. Specifically, masking information used when displaying contents of the display memory 16 is written in the display memory 29 and the display controller 17 is provided with a function of masking part of the radar echoes based on the masking information written in the display memory 29. Using this function, the symbol display controller 28 writes the data for displaying the AIS symbols together with the masking information for prohibiting display of the radar echoes at and around the locations of the AIS symbols in the display memory 29. This arrangement makes it possible to prohibit on-screen display of the radar echoes at and around the locations of the AIS symbols.

Figure 11:
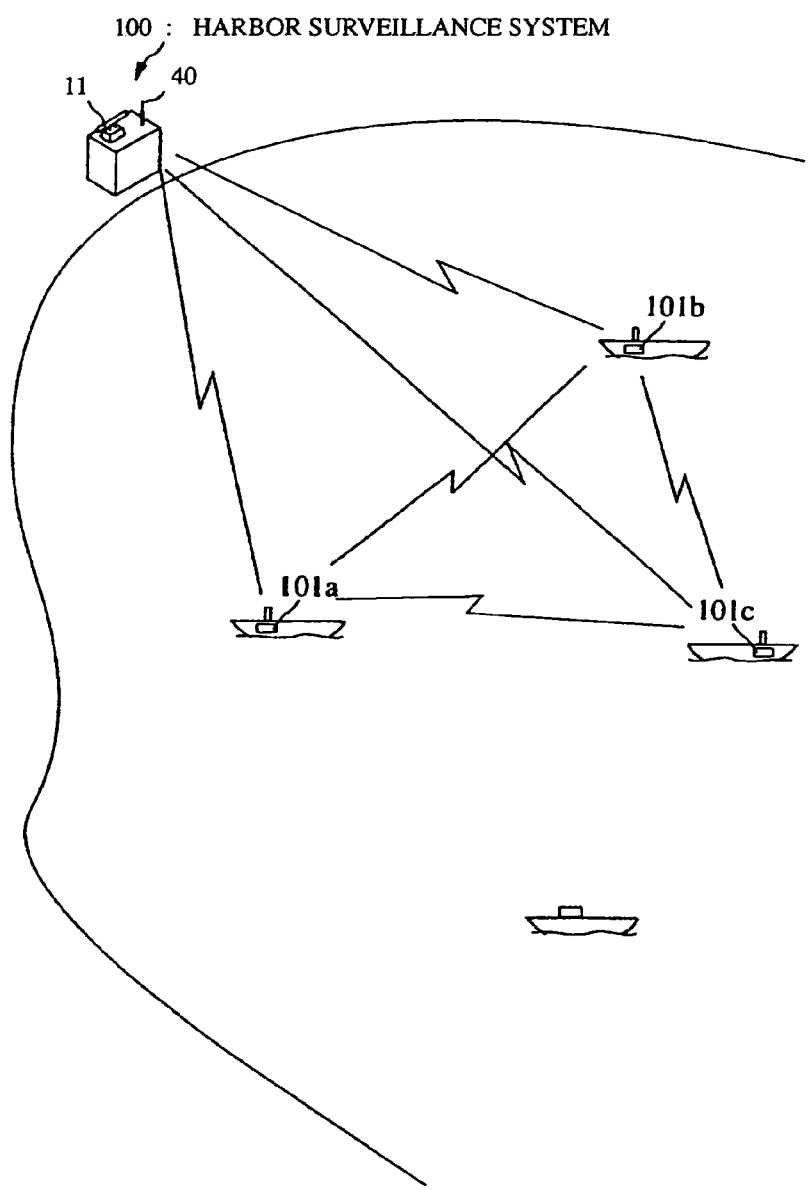
FIG. 11 is a diagram showing the configuration of a harbor surveillance system according to a seventh embodiment of the invention.
Figure 12:
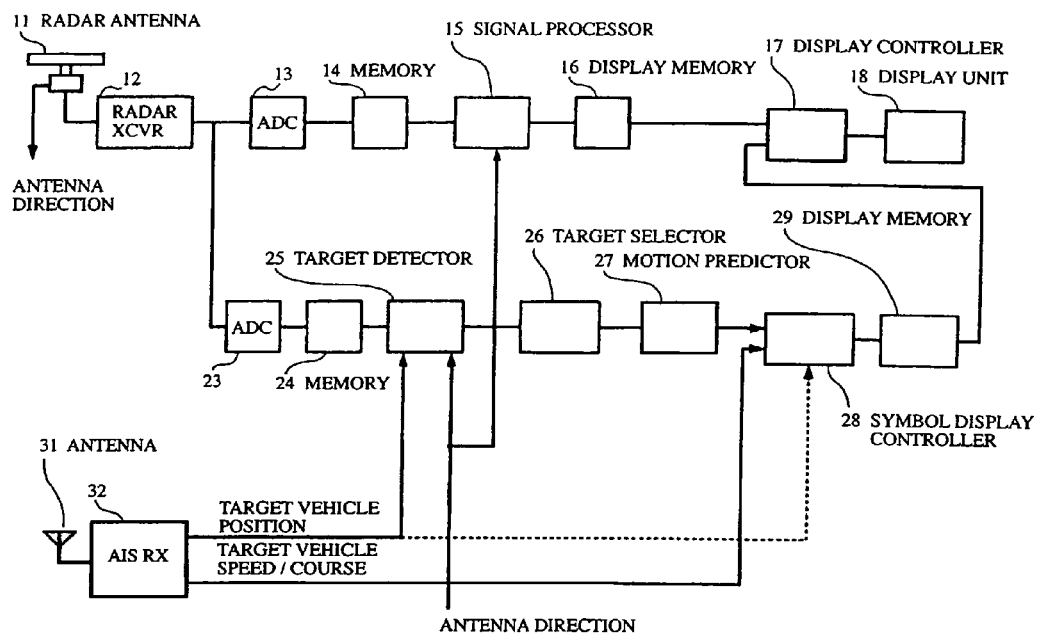
FIG. 12 is a block diagram showing the configuration of a harbor surveillance apparatus used in the harbor surveillance system of FIG. 11.

Configurations of a harbor surveillance apparatus according to the seventh embodiment of the invention and a harbor surveillance system using the harbor surveillance apparatus are now described referring to FIGS. 11 and 12.

While the vehicle information display apparatus of the fifth to seventh embodiments are intended for installation on a vessel, the harbor surveillance apparatus of the seventh embodiment is intended for use in a coast station for monitoring the positions and movements of vehicles in harbor areas.

FIG. 11 is a general configuration diagram of the harbor surveillance system, in which designated by the numeral 100 is the harbor surveillance apparatus of the seventh embodiment provided at a coastal site looking on a harbor, designated by the numeral 11 is an antenna of a harbor radar and designated by the numeral 40 is an antenna of an AIS receiver. Further, designated by the numerals 101a, 101b and 101c are target vehicle detecting apparatus installed on target vehicles existing in the harbor. The construction of these target vehicles is the same as shown in FIG. 1.

FIG. 12 is a block diagram showing the configuration of the harbor surveillance apparatus of the embodiment. The configuration of the harbor surveillance apparatus is basically the same as shown in FIG. 7. It is to be noted, however, that the harbor surveillance apparatus of this embodiment is not provided with a GPS receiver 34 as it is installed at a known location. Also, the apparatus is not provided with an AIS transmitter 36 or a gyrocompass 35.

It should be apparent from the foregoing discussion that the invention is applicable to equipment and systems for receiving vehicle identification signals transmitted from onboard AIS transmitters and for acquiring and tracking vehicles using target echoes detected by a harbor radar.

FIG. 1
1. AIS ANTENNA
2. AIS DATA TRANSCEIVER
3. PRIME VEHICLE POSITION/SPEED MEASURING UNIT
4. RADAR ANTENNA
5. RADAR TRANSCEIVER
6. ARPA UNIT
7. DATA CONTROL/DISPLAY PROCESSING UNIT
8. TARGET DATABASE
9. DISPLAY UNIT
10. OPERATOR TERMINAL

FIG. 2
START
N1 READ DATA FROM AIS AND ARPA
N2 READ DISPLAY MODE SETTING
N3 UPDATE DATABASE
N4 NO. OF TARGETS > MAX NO. OF INDICATABLE TARGETS?
N5 EXTRACT MAX NO. OF INDICATABLE TARGETS FROM TARGETS OF GREATER IMPORTANCE
N6 DISPLAY SYMBOLS OF EXTRACTED TARGETS
N7 DISPLAY SYMBOLS OF ALL TARGETS
END

FIG. 4
START
N11 READ DATA FROM AIS AND ARPA
N12 READ DISPLAY MODE SETTING
N13 UPDATE DATABASE
N14 READ SETTING OF IMPORTANCE OF TARGETS TO BE DISPLAYED
N15 DISPLAY SYMBOLS OF RELEVANT TARGETS

FIG. 5
START
N1 READ DATA FROM AIS AND ARPA
N2 READ DISPLAY MODE SETTING
N3 UPDATE DATABASE
N4 NO. OF TARGETS > MAX NO. OF INDICATABLE TARGETS?
N5 EXTRACT MAX NO. OF INDICATABLE TARGETS FROM TARGETS OF GREATER IMPORTANCE
N6 DISPLAY SYMBOLS OF EXTRACTED TARGETS
N7 DISPLAY SYMBOLS OF ALL TARGETS
END

FIG. 6
START
N1 READ DATA FROM AIS AND ARPA
N2 READ DISPLAY MODE SETTING
N3 UPDATE DATABASE
N9 DISPLAY SYMBOLS OF ALL TARGETS
N10 DISPLAY LIMITING KEY?
N11 EXTRACT MAX NO. OF INDICATABLE TARGETS FROM TARGETS OF GREATER IMPORTANCE
N12 DISPLAY SYMBOLS OF UNEXTRACTED TARGETS IN A RESERVED FASHION OR DELETE THEM
END

FIG. 7
11. RADAR ANTENNA
12. RADAR XCVR
13. ADC
14. MEMORY 14
15. SIGNAL PROCESSOR
16. DISPLAY MEMORY
17. DISPLAY CONTROLLER
18. DISPLAY UNIT
23. ADC
24. MEMORY
25. TARGET DETECTOR
26. TARGET SELECTOR
27. MOTION PREDICTOR
28. SYMBOL DISPLAY CONTROLLER
29. DISPLAY MEMORY
31. ANTENNA
32. AIS RX
33. ANTENNA
34. GPS RX
35. COMPASS
36. AIS TX
ANTENNA DIRECTION
TARGET VEHICLE SPEED/COURSE
ANTENNA DIRECTION
PRIME VEHICLE POSITION
PRIME VEHICLE SPEED
PRIME VEHICLE HEADING

-continued

FIG. 8

AIS TARGET                              ARPA TARGET

FIG. 9

TARGET ECHO                      MASK

FIG. 10
MASK AREA GENERATION

START
ENTER PRIME VEHICLE POSITION DATA
ENTER HEADING DATA
ENTER AIS DATA
GENERATE MASK AREAS FROM AIS TARGET DATA
UPDATE MASK AREA DATABASE
TARGET EXTRACTION

START
DETERMINE CENTRAL POSITION OF TARGET ECHO
DELETE POSITION DATA OF ECHOES IN MASK AREAS

What is claimed is:

1. A vehicle information display apparatus comprising:
a vehicle position information extractor for receiving vehicle identification signals transmitted from vessels and extracting at least position information indicating the positions of the vessels from the vehicle identification signals;
a target acquisition/tracking device for acquiring and tracking targets based on target echo data fed from a radar; and
a controller for displaying first symbols indicating the positions or velocity vectors of the individual vessels obtained by said vehicle position information extractor as well as second symbols indicating the positions or velocity vectors of the individual targets obtained by said target acquisition/tracking device on a single display device, wherein said controller displays the first symbols with higher priority over the second symbols at and in the proximity of a position where any of the first symbols is displayed.

2. The vehicle information display apparatus according to claim 1, wherein said controller prohibits acquisition and tracking of targets by said target acquisition/tracking device at and in the proximity of the position where any of the first symbols is displayed.

3. The vehicle information display apparatus according to claim 1, wherein said controller prohibits on-screen display of the second symbols at and in the proximity of the position where any of the first symbols is displayed.

4. The vehicle information display apparatus according to claim 1, wherein said controller prohibits on-screen display of the second symbols and target echoes detected by the radar at and in the proximity of the position where any of the first symbols is displayed.

5. The vehicle information display apparatus according to claim 1, wherein said controller prohibits on-screen display of the second symbols without prohibiting on-screen display of target echoes detected by the radar at and in the proximity of the position where any of the first symbols is displayed.

6. The vehicle information display apparatus according to claim 1, wherein said vehicle position information extractor is a universal ship borne automatic identification system and said target acquisition/tracking device is an automatic radar plotting aid.

7. The vehicle information display apparatus of claim 1, wherein said vehicle information display apparatus is a vehicle surveillance apparatus, said target acquisition/tracking device acquiring and tracking targets based on target echo data fed from a land-based radar.

* * * * *